Patented Nov. 24, 1942

2,302,805

UNITED STATES PATENT OFFICE 2,302,805

COMPOSITION FOR MOTHPROOFING

Heribert Schüssler, Cologne-Deutz, Germany, assignor, by mesne assignments, to General Aniline & Film Corporation, New York, N. Y., a corporation of Delaware No Drawing. Application August 31, 1937, Serial No. 161,752. In Germany September 3, 1936

5 Claims. (Cl. 167—37)

The present invention relates to a process for protecting any kind of material subject to the attack by moths and animal pests from the damage caused thereby.

My invention broadly consists in incorporating with the said material a cyclic organic compound containing a nucleus selected from the group consisting of the aromatic and heterocyclic nuclei, said nucleus having a substituent containing a quaternary nitrogen atom. In the compounds to be used according to my invention, the said substituent may contain one or more carbon atoms, and the carbon linkage may be interrupted by hetero atoms and/or groups of hetero atoms as, for instance, O, S, $SO_2$, N, P and the like. Furthermore, the said compounds may be substituted in any desired way, for instance, by halogen, hydroxy, amino, sulfo, sulfoester, carboxylic acid, ether or thioether groups and the like. The compounds may also contain more than one quaternary ammonium group. Besides I have found such compounds to be particularly suitable for my process as owing to their higher molecular weight they have a higher affinity for the material to be protected. Therefore, such compounds are preferably used in my process which contain, as a substituent, an aliphatic radical of at least 6 carbon atoms.

Preferred compounds for use in the process of my invention may be obtained by causing diphenyl derivatives, such as 4-hydroxydiphenyl, to react with monochlorotriethylamine and then transforming the products with monochlorobenzyl chloride into the quaternary ammonium compounds. In this way a substance is obtained which is highly active against textile pests and which possesses an affinity for the fiber. Instead of the 4-hydroxydiphenyl also 4-aminodiphenyl may be caused to react with monochlorotriethylamine in the same manner and transformed as described above into the quaternary compound. The chlorotriethylamine may also be replaced by 1.3-monochloropropylamine, and for the subsequent transformation into the quaternary ammonium compound diethyl sulfate, dimethyl sulfate or other suitable alkylating agents may be used. Instead of monochlorobenzyl chloride also halogenides which are otherwise substituted may be employed.

It is also possible to use instead of diphenyl derivatives, for instance derivatives of diphenylmethane, of triphenylmethane or heterocyclic compounds, as for example:

The condensation product of 1 mol of diethylamino-2'-hydroxy-3'.5'-dichlorodiphenylmethane and monochlorotriethylamine, rendered quaternary with dimethyl sulfate.

The condensation product of 1 mol of 2.2'-dihydroxy-3.3'.5.5'.4"-pentachlorotriphenylmethane-2"-sulfonic acid sodium salt with 2 mols of monochlorotriethylamine, rendered quaternary with dimethyl sulfate or dichlorobenzyl chloride.

The amides from substituted triphenylmethane sulfonic acids and substituted alkylene diamines which are rendered quaternary on the amine nitrogen atom, as, for instance, an amide from N-methyl-N'-dimethyl (ethyl)-ethylenediamine and rendered quaternary with dimethyl sulfate.

Of the heterocyclic compounds, for instance those of the triphenylmethane type may be mentioned, such as condensation products of isatin with substituted phenols, which compounds are caused to react with monochlorotriethylamine on the nitrogen atom of the isatin and which are rendered quaternary on the amine nitrogen atom.

In a similar manner highly active products can be obtained by causing, for instance, monochlorotriethylamine to react with acid amides and by subsequently quaternizing the products so obtained. Also acid chlorides as such may be employed for the same purpose if they are caused to react with such diamines or polyamines as contain at least one N-atom which may be rendered quaternary.

Still another group of products suitable for use according to my invention are cyclic organic compounds of the general type:

$$R.N^{IV}$$

wherein

R is an aralkyl radical and $N^{IV}$ is a quaternary nitrogen atom.

Particularly suitable are the aralkylammonium compounds substituted in the aryl radical and among these especially the halogen substituted aralkyl-ammonium compounds. Further, the ammonium compounds derived from alkyl diamines and among these the mono-ammonium compounds which contain one or two aralkyl radicals of the benzene series attached to a tertiary nitrogen atom are particularly effective. If ammonium compounds are used which contain only one nitrogen atom it is advantageous to use such compounds as contain besides the aralkyl radical at least one alkyl radical with 6 or more carbon atoms. The ammonium compounds of the kind specified may be used in the form of the bases or in the form of the salts, in particular in the form of mineral acid salts, for instance halides, such as chlorides, bromides and fluorides, furthermore sulfates and sulfonates and others.

The following substances may be mentioned as moth-proofing agents:

Benzyl - diethyl - dodecylammonium chloride, 3.4 - dichlorobenzyl - diethyl - dodecylammonium chloride, xylyl-pyridinium chloride, menaphthyl-pyridinium chloride, bis-(3.4-dichlorobenzyl)-nicotinium chloride, di -(3.4 - dichlorobenzyl)-aminoethyl-triethylammonium sulfethylate, (3,4-dichlorobenzyl - methyl) -amino - ethyl - 3'.4'-dichlorobenzyl-dimethylammonium sulfomethylate, dibenzyl - dimethyl - di -(3,4-dichlorobenzyl)-trimethylene diammonium bromide.

This series of suitable compounds may be continued at will, in particular on considering what is known about the suitability of the intermediate products as moth-proofing agents. For, in the case of such compounds as even in the absence of a quaternary nitrogen atom display a certain protective action against moths, dermestidae and the like, and hinder the growth of bacteria, this protective action is further increased by introducing a quaternary nitrogen atom. The products will then show a sufficient moth-proofing action even in very low concentration. Moreover, compounds of the kind described not only show an affinity for the animal fiber but also for the vegetable fiber and thus are favorably distinguished from such known moth-proofing agents as only take on the animal fiber. This property is of particular importance for the treatment of mixed animal and vegetable material, since it has been found that under certain conditions also vegetable fibers may be attacked by moths and other animal pests.

My present process may be used for protecting any kind of material subject to the attack by moths, dermestidae, bacteria and like animal pests, the said materials comprising for instance textiles, paper, hides, leather, furs, feathers and the like.

The protective substances may be employed in aqueous solution and also in suitable organic solvents. An especially good fixing of the protective substances on the materials is obtained by performing the treatment at higher temperatures, for example at boiling temperature. The treatment is preferably combined with one of the usual steps in the treatment of fibrous materials. The treatment may thus take place, for example, during the dyeing or rinsing process, in the backwashing machine, during the finishing or greasing process, or in French cleaning. Likewise, the solutions of the protective substance may be brought onto the fiber by spraying or brushing or in any way allowing of an even permeation of the material by the protective substance. In many cases it is of advantage to add the protective substance to the soap bath or to use soaps provided with a content of protective substance. Furthermore, the present products may be used in admixture with each other and with other substances suitable for combating animal pests like fluorine compounds, alkaloids and others.

The following examples illustrate my invention without, however, restricting it thereto, the parts being by weight:

*Example 1*

Wool is treated by boiling for one hour in a dyeing apparatus in a bath of 1:20 with 0.5% of the amide of 3.5.3'.5'-tetrachloro-2.2'-dihydroxytriphenylmethane-2''-sulfonic acid and delta-(methyl-amino- pentyl) - diethyl - methyl-ammonium-sulfomethylate of the formula:

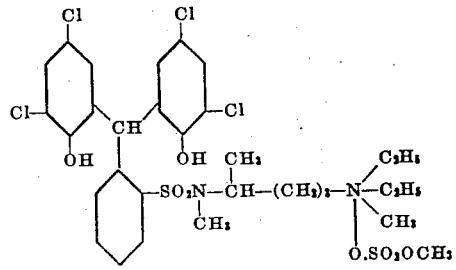

with the addition of 20% of sodium sulfate. The wool is thereby rendered moth-proof.

*Example 2*

Mixed tissue of wool and artificial silk from regenerated cellulose is treated for one hour with 2% of the quaternary ammonium compound from 3.5.3'.5'.4''-pentachloro-2.2'-bis-diethyl-aminoethylether-triphenylmethane- 2'' - sulfonic acid sodium salt and dimethyl sulfate of the formula:

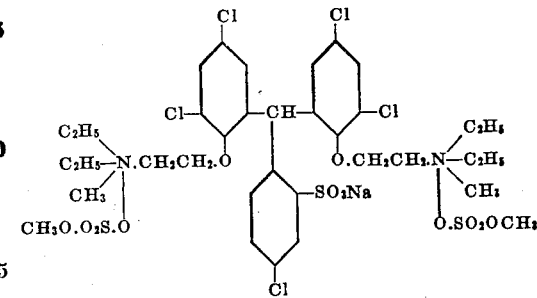

in a bath of 1:30 at a temperature of 90–95° C. The goods are rendered immune from attack by moth larvae.

*Example 3*

Wool yarn is treated for one hour in a bath of 1:50 with 1.5% of the quaternary ammonium compound from 2.2'-diethylaminoethylether-3.3'-dimethyl-5.5'.2''- trichlorotriphenylmethane and 2 mols of 3.4-dichlorobenzyl chloride of the formula:

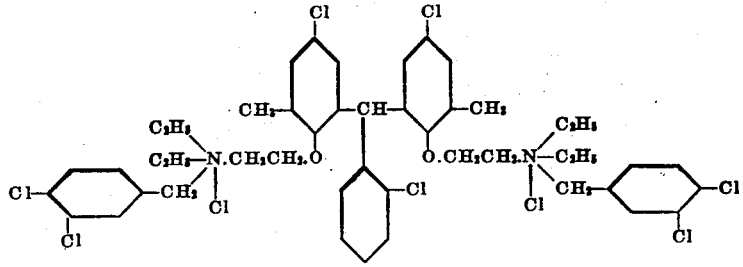

at a temperature of 90–95° C. and in the presence of sodium sulfate.

*Example 4*

Staple fiber from regenerated cellulose is treated for 3 quarters of an hour at boiling temperature with 0.5% of the quaternary ammonium compound of 2.2'-diethylaminoethylether-5.5'-dichloro-diphenyl-methane and 1 mol of 3.4-dichlorobenzyl chloride of the formula:

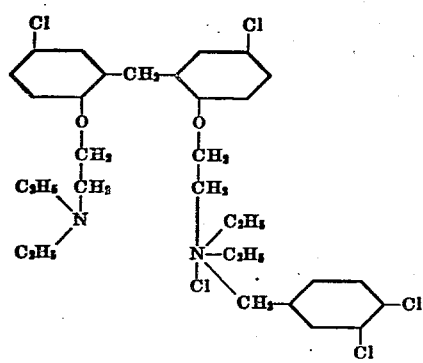

The goods will not be attacked by moth larvae.

Example 5

The goods to be treated are immersed in or sprinkled with a 20% alcoholic solution of the quaternary ammonium compound of 2.4-diamino-diphenyl - 2.4 - dichlorobenzyl chloride, monochlorotriethylamine and dimethyl sulfate probably of the formula:

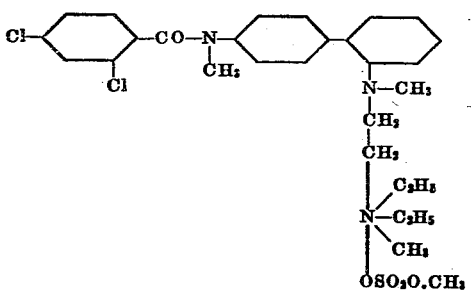

The goods are rendered moth-proof.

Example 6

If to a paper pulp 2-3 grams per liter of the quaternary ammonium compound of 3-bis-(3',5'-dichloro - 2' - hydroxyphenyl) -1-diethyl - aminoethyl-oxindol and para-chloro-benzyl chloride of the formula:

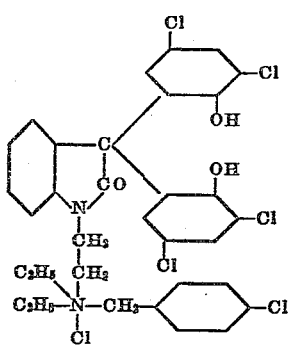

are added the paper produced therefrom is protected against paper pests, such as cockroaches and the like.

Example 7

Wool is treated by boiling for 3 quarters of an hour with 2% of the quaternary ammonium compound from methyl-2-chloro-4-(diethyl- aminoethoxy)-diphenylmethane and 3.4-dichloro-benzyl chloride of the formula:

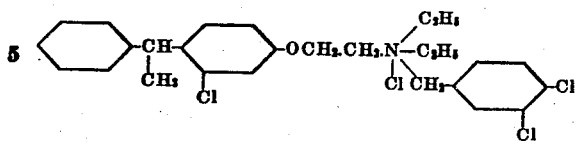

The goods are rendered moth-proof thereby.

Example 8

On treating wool by boiling with 1% of the monoquaternary ammonium compound from 1 mol of 2.4-diamidodiphenyl, 2 mols of monochlorotriethylamine and 1 mol of 3.4-dichlorobenzylchloride of the probable formula:

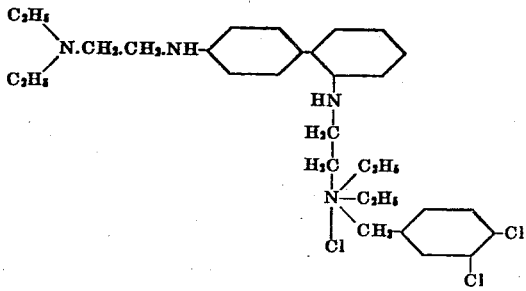

the goods are rendered moth-proof.

Example 9

Staple fiber is treated for one hour at 60–70° C. with 1.5–2% of the quaternary compound from 4-diethylamino-diphenylmethane-3'.5'-dichloro-2'-diethylaminoethyl ether and dimethyl sulfate of the formula:

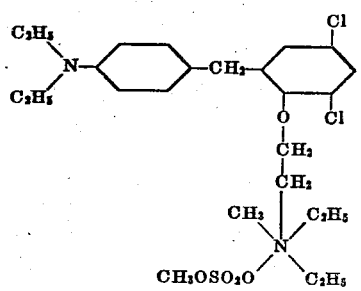

The goods are rendered immune from attack by moth larvae.

Example 10

Mixed tissue of wool and artificial silk from regenerated cellulose is treated for 3 quarters of an hour at 80° C. with 1% of the amide of 3.5.3'.5'-tetrachloro - 2.2' - diacetoxytriphenylmethane-2''.sulfonic acid and beta-methylaminoethyltrimethylammonium sulfomethylate of the formula:

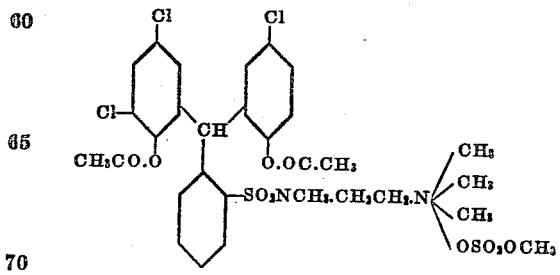

The goods are rendered moth-proof thereby.

Example 11

When treating feather for half an hour or three quarters of an hour at 30–40° C. with a solution of 6–8 grams per 1 liter of the quaternary ammonium compound obtainable from 1 mol of 3.4.3′4′-bis(-dichlorophenoxy) phosphor sulfochloride, 1 mol of asymmetric diethylenediamine and 1 mol of 3.4-dichlorobenzyl chloride of the formula:

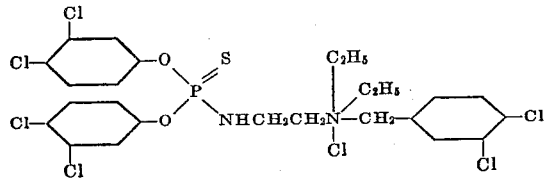

the feathers are rendered immune from attack by moth larvae.

*Example 12*

Piece goods are treated on the washing machine in a bath of 1:30 with 3% xylyl-pyridinium chloride for 3 quarters of an hour at 40–50° C. and finished in the usual manner. The goods treated in this manner are moth-proof.

*Example 13*

Wool is treated in a dyeing apparatus in a bath of 1:6 with 1.5% 3.4-dichlorobenzyl-diethyldodecylammonium chloride for 3 quarters of an hour at 75° C., centrifuged and dried. The wool thus treated is moth-proof.

*Example 14*

On adding to an olein spinning softener 10 grams of (3.4-dichlorobenzyl-methyl)-aminoethyl - 3′4′ - dichlorobenzyl-dimethylammonium-sulfomethylate per liter the wool treated with the said softener is rendered moth-proof.

*Example 15*

If unspun wool on the backwashing machine is caused to flow in the last bath through a solution of 8–10 grams of di-(3.4-dichlorobenzyl)-aminoethyl - triethylammonium - sulfomethylate the wool will not be attacked by moth.

*Example 16*

On treating wool-covers with a 2–3% solution of menaphthyl-pyridinium-chloride, for instance in chloroform, the wool-covers are protected against moth after the chloroform has evaporated.

*Example 17*

A woolen fabric is treated for half an hour to 3 quarters of an hour at 60° C. in a bath of 1:3 with 1.5% of the reaction product of 3.4-dichlorobenzene sulfomonomethylamide and monochlorotriethylamine which has been transformed by the aid of 3.4-dichlorobenzyl chloride into the quaternary compound of the formula:

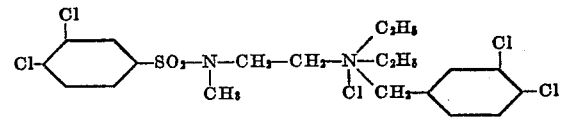

Thereby the fabric is rendered immune from attack by moth larvae.

I claim:

1. A moth-proofing composition containing as its essential ingredient a cyclic, organic, quaternary ammonium compound selected from the class consisting of those containing from one to three monocyclic aryl radicles and those containing nitrogenous mono- and di- cyclic hetero radicles, said compound having therein a quaternary ammonium group selected from the group consisting of

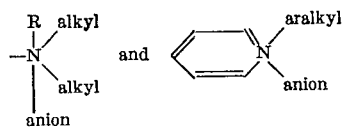

wherein R is a member of the group consisting of alkyl and aralkyl radicles.

2. A moth-proofing composition as defined in claim 1 wherein the cyclic, organic, quaternary ammonium compound is a derivative of triphenylmethane.

3. A moth-proofing composition containing as its essential ingredient a compound having the formula:

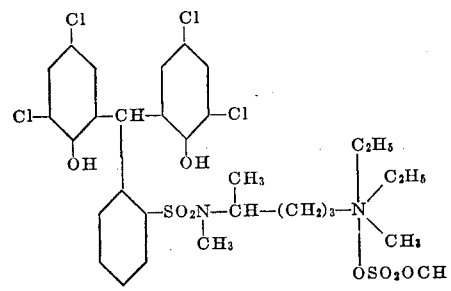

4. A moth-proofing composition as defined in claim 1 wherein the cyclic, organic, quaternary ammonium compound is a derivative of diphenylmethane.

5. A moth-proofing composition containing as its essential ingredient a compound having the formula:

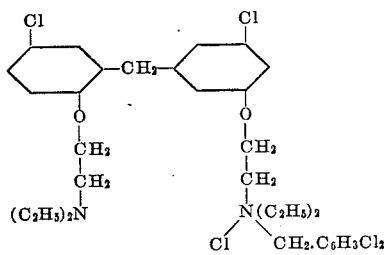

HERIBERT SCHÜSSLER.